United States Patent [19]
Malfroid et al.

[11] Patent Number: 5,003,038
[45] Date of Patent: Mar. 26, 1991

[54] PROCESS FOR THE MANUFACTURE OF VINYL CHLORIDE POLYMERS MODIFIED WITH LACTONE POLYMERS AND PRODUCT THEREOF

[75] Inventors: Pierre Malfroid, Grez-Doiceau; Qui L. Nguyen, Brussels; Nicole Dewaele, Brussels; Jean-Marie Blondin, Brussels; Jean-Paul Burnay, Brussels, all of Belgium

[73] Assignee: Solvay & Cie (Société Anonyme), Brussels, Belgium

[21] Appl. No.: 491,519

[22] Filed: Mar. 12, 1990

[30] Foreign Application Priority Data

Mar. 13, 1989 [FR] France .................................. 89 03371
Dec. 6, 1989 [BE] Belgium ................................ 8901305

[51] Int. Cl.$^5$ ...................... C08G 63/08; C08G 81/02
[52] U.S. Cl. .................................. 528/357; 525/412; 525/415; 528/358
[58] Field of Search ................ 525/412, 415; 528/357, 528/358

[56] References Cited
U.S. PATENT DOCUMENTS 4,826,934 5/1989 Malfroid et al. .

FOREIGN PATENT DOCUMENTS 0264982 4/1988 European Pat. Off. .

OTHER PUBLICATIONS

Chemical Abstracts 104, 51560f (1986).
Derwent Publications Ltd., J6 0090-208-A, Kanegafuchi Chem. KK.
Derwent Publications Ltd., J6 1062-547-A, Mitsubishi Monsanto KK.

*Primary Examiner*—Earl Nielsen
*Attorney, Agent, or Firm*—Spencer & Frank

[57] ABSTRACT

In a first stage, a lactone is polymerized by an ionic route in vinyl chloride with the aid of a catalyst consisting of the product, optionally complexed with tetrahydrofuran, of the reaction of an alkylmetal with ethylenically unsaturated alcohol, optionally in the presence of water and, in a second stage, the said vinyl chloride is polymerized by a radical route in an aqueous suspension and in the presence of the polymerization medium originating from the first stage, to which other unsaturated monomers are optionally added.

The invention also relates to new modified vinyl chloride polymers consisting of lactone polymers whose number-average molecular weight is less than 5,000, grafted with vinyl chloride polymers.

12 Claims, No Drawings

PROCESS FOR THE MANUFACTURE OF VINYL CHLORIDE POLYMERS MODIFIED WITH LACTONE POLYMERS AND PRODUCT THEREOF

The present invention relates to an improved process for the manufacture of vinyl chloride polymers modified with lactone polymers. It also relates to new vinyl chloride polymers modified with lactone polymers of low molecular weight.

Japanese Patent Applications JA-A-60/090,208 of 22 Oct. 1983 (Kanegafuchi Chem.) and JA-A-61/062,547 of 4 Sept. 1984 (Mitsubishi Monsanto Chem.) describe the manufacture of vinyl chloride polymers modified with lactone polymers by dissolving a preformed lactone polymer in vinyl chloride, followed by polymerization in aqueous suspension with grafting of vinyl chloride onto the lactone polymer. This process of the prior art has many disadvantages, in that it requires the lactone polymer to be manufactured, isolated from its polymerization medium and dried before being used in vinyl chloride polymerization, and the resulting modified vinyl chloride polymer to be isolated and dried. Moreover, the redissolving of the lactone polymer in vinyl chloride usually constitutes a lengthy operation.

Furthermore, French Patent Application FR-A-86/13,204 of 18.9.1986 (Solvay & Cie), which corresponds to U.S. Pat. No. 4,826,934 issued May 2nd, 1989, describes a process which can be employed for the manufacture of vinyl chloride polymers modified with lactone polymers and which does not have the abovementioned disadvantages. According to this process, in a first stage, a lactone is polymerized by an ionic route in vinyl chloride and, in a second stage, the said vinyl chloride, to which other unsaturated monomers capable of being polymerized by a radical route may be added, is polymerized by a radical route in aqueous dispersion and in the presence of the polymerization medium originating from the first stage. In examples of embodiments relating to the manufacture of such modified vinyl chloride polymers, the ionic catalyst used in a proportion of 0.02 gram-atoms of metal per mole of lactone consists of an alkylated and alkoxylated aluminum derivative, complexed with tetrahydrofuran and obtained by the use of trialkylaluminium, a diol and water. These catalysts produce lactone polymers which have very high molecular weights and viscosities. In industrial practice it has now transpired that the large increase in the viscosity of the lactone polymerization mixture leads to difficulties in stirring, which can affect the homogeneity of the modified vinyl chloride polymers obtained at the end of the second stage and, consequently, the surface appearance of the finished articles manufactured with their aid.

Increasing in the catalyst concentration has made it possible to reduce the molecular weight of the polylactones and to overcome the abovementioned disadvantages. Likewise, the use of a similar catalyst in which butanediol has been replaced with butanol has led to polylactones of reduced molecular weights and has therefore also made it possible to solve the problem of the high viscosity of the lactone polymerization mixture. However, it has transpired that flexible articles manufactured from polyvinyl chlorides modified with the aid of such polylactones of reduced molecular weights give rise to exudation.

The present invention provides an improved process for the manufacture of vinyl chloride polymers modified with lactone polymers, which does not have the abovementioned disadvantages, while having the benefit of the advantages, simplicity and economy of the process described in French Patent Application FR-A-86/13,204 and which produces modified polymers exhibiting a homogeneity which is further increased. It also provides new vinyl chloride polymers modified with lactone polymers, consisting of lactone polymers of low average molecular weight grafted with vinyl chloride polymers.

To this end, the present invention provides a process in which, in a first stage, a lactone is polymerized by an ionic route in vinyl chloride and, in a second stage, the said vinyl chloride, to which other unsaturated monomers capable of being polymerized by a radical route are optionally added, is polymerized by a radical route in aqueous dispersion and in the presence of the polymerization medium from the first stage, characterized in that the ionic catalyst of the first stage consists of the product, optionally complexed with tetrahydrofuran, of the reaction of an alkylmetal with an ethylenically unsaturated alcohol, optionally in the presence of water. The ionic catalysts employed in the first stage of the process according to the invention are therefore essentially distinguished from the catalysts described previously by the fact that they result from the reaction of an alkylmetal with an ethylenically unsaturated alcohol. The optional presence of tetrahydrofuran complexing agent has no effect on the activity of the catalyst.

The vinyl chloride polymers modified with lactone polymers and obtained according to the process of the invention exhibit an appreciable degree of grafting, generally of some tens per cent and in the majority of cases higher than 50%, so that the flexible articles manufactured from these modified polymers do not exude, despite the reduced average molecular weight of the lactone polymers.

The process according to the invention therefore comprises a first stage during which a lactone is polymerized by an ionic route. The polymerization of a lactone is intended to denote the homopolymerization of a lactone or the copolymerization of a number of lactones.

A lactone is intended to denote any lactone. Nevertheless, preference is given to the lactones in which the heteroatomic ring contains from 4 to 16 atoms. By way of examples of such lactones there may be mentioned $\beta$-propiolactone, $\beta$-butyrolactone, $\delta$-valerolactone, $\epsilon$-caprolactone, capryllactone and laurolactone, lactide, glycolide and their alkylated and/or halogenated substitution derivatives, such as $\beta,\beta$-bis(chloromethyl)-$\beta$-propiolactone, pivalolactone, methylcaprolactones and chlorocaprolactones. Lactones which are particularly preferred are the unsubstituted lactones whose heteroatomic ring contains 4, 6, 7 or 8 atoms, that is to say $\beta$-propiolactone, $\delta$-valerolactone, $\epsilon$-caprolactone and $\zeta$-oenantholactone. A lactone which is very particularly preferred is $\epsilon$-caprolactone.

It is therefore possible to subject to the polymerization by an ionic route one or more lactones, such as those defined above, this taking place either simultaneously with formation of random copolymers, or successively with formation of block copolymers. The properties of the lactone polymers (modifying polymers) can therefore be modified, depending on the choice of the monomer(s) and on the way they are used.

Nevertheless, preference is given to homopolymerization, and still more particularly to the homopolymerization of ε-caprolactone.

The unsaturated comonomers capable of being polymerized with vinyl chloride in the second stage can be chosen from all the usual comonomers of vinyl chloride. By way of examples of such comonomers there may be mentioned olefins, halogenated olefins, vinyl ethers, vinyl esters and acrylic esters, nitriles and amides.

A vinyl chloride polymer is therefore intended to denote the homopolymers and the copolymers, random or block, of vinyl chloride, containing at least 50% by weight, and preferably 65% by weight, of the vinyl chloride.

A modified vinyl chloride polymer is therefore intended to denote the polymers, vinyl chloride homo- and copolymers, such as defined above, modified with lactone polymers such as defined above.

The catalyst employed in the first stage of the process according to the invention is chosen from the products, optionally complexed with tetrahydrofuran, of the reaction of an alkylmetal with an ethylenically unsaturated alcohol, optionally in the presence of water. The alkylmetals employed are advantageously those in which the alkyl groups, which are identical or different, are chosen from straight- or branched-chain alkyl groups containing from 1 to 18 carbon atoms. Preference is given to the alkylmetals whose alkyl groups are identical and contain from 2 to 12 carbon atoms and still more particularly to those whose identical alkyl groups contain from 2 to 5 carbon atoms. Insofar as the nature of the metal of the alkylmetal is concerned, this is not critical. Advantageously, alkylmetals are employed, in which the metal is chosen from lithium, magnesium, zinc, titanium, zirconium, tin and aluminum. Nevertheless, preference is given to the alkylmetals in which the metal is chosen from aluminum and/or zinc and, still more particularly, to aluminum.

An ethylenically unsaturated alcohol is intended to denote primary, secondary or tertiary alcohols containing at least one ethylenic unsaturation. The ethylenically unsaturated alcohols which can be employed according to the process of the invention can therefore contain one or more ethylenic unsaturations and these may be situated in the chain or at a chain end. Nevertheless, preference is given to ethylenically unsaturated alcohols in which the ethylenic unsaturation(s) is(are) situated at a chain end and, still more particularly, to the ethylenically monounsaturated alcohols in which the unsaturation is situated at a chain end. Furthermore, preference is given to primary alcohols. Ethylenically unsaturated alcohols which are very particularly preferred within the scope of the present invention consist, therefore, of ethylenically monounsaturated primary alcohols in which the unsaturation is situated at a chain end. The total number of carbon atoms of the ethylenically unsaturated alcohol is not critical. In general, it contains from 3 to 20 carbon atoms and in most cases from 3 to 12 carbon atoms. The ethylenically unsaturated alcohols are therefore preferably chosen from ethylenically monounsaturated primary alcohols whose unsaturation is situated at a chain end and which contain from 3 to 12 carbon atoms and still more particularly from those containing from 3 to 6 carbon atoms. A very particularly preferred ethylenically unsaturated alcohol is allyl alcohol. Accordingly, catalysts which are particularly preferred consist of the products, optionally complexed with tetrahydrofuran, of the reaction of an alkylmetal in which the metal is chosen from aluminum and/or zinc and whose identical alkyl groups contain from 2 to 5 carbon atoms, with an ethylenically monounsaturated primary alcohol in which the unsaturation is situated at a chain end and which contains from 3 to 6 carbon atoms, optionally in the presence of water.

The molar proportions of the reactants (alkylmetal, alcohol and possibly water) and, optionally, of the tetrahydrofuran used for the manufacture of the catalyst employed in the first stage are not critical and may vary to a fairly wide extent. From 0.1 to 3 moles and, preferably, from 0.5 to 2 moles of ethylenically unsaturated alcohol per gram-atom of active metal are generally employed. In the case where water is also involved in the manufacture of the catalyst, from 0.01 to 0.5 moles of water per gram-atom of active metal are generally employed. In the case where the catalyst is complexed with tetrahydrofuran, the latter is generally used in a proportion of 0.1 to 20 moles and, more particularly, in a proportion of 1 to 5 moles per gram-atom of active metal.

The method of manufacture of the catalyst is not critical. The latter may be employed in the pure state or in solution in an inert diluent such as hexane, heptane, and the like, or in liquid vinyl chloride. The reaction may be carried out between $-70°$ and $+70°$ C, preferably between $-30°$ and $+20°$ C. It must be carried out in the absence of air. The order of introduction of the reactants and, optionally, of the complexing agent is not critical in the case where the catalyst is manufactured in an inert diluent. In this case, a particularly simple operating procedure consists in introducing the hydroxyl-containing reactant (alcohol and, where appropriate, water) and, optionally, tetrahydrofuran dropwise into a solution of the alkylmetal(s) in an inert diluent, cooled to about $-20°$ C. and blanketed with pure, dry nitrogen. In the case where the catalyst is manufactured in vinyl chloride, it is essential to introduce the alkylmetal(s) into a solution of the ethylenically unsaturated alcohol (optionally containing tetrahydrofuran) in liquid vinyl chloride under nitrogen pressure.

The catalyst concentration may vary to a fairly wide extent. It is obvious that the catalyst concentration affects the average molecular weight of the lactone polymer and that at the same catalyst concentration the alcohol/metal molar ratio used for the manufacture of the catalyst also affects the average molecular weight of the lactone polymer. The catalyst is generally used in a proportion of 0.001 to 0.1 gram-atoms of active metal and, preferably, in a proportion of 0.005 to 0.05 gram-atoms of active metal per mole of polymer capable of being polymerized by an ionic route (lactone(s)).

In accordance with a preferred embodiment of the invention, the catalyst concentration is adjusted so as to produce lactone polymers whose number-average molecular weight (Mn) is lower than 10,000 and still more particularly lower than 5,000. The number-average molecular weight of the lactone polymers is advantageously between 2,000 and 4,000.

The respective quantities of, on the one hand, lactone and, on the other hand, vinyl chloride which are used in the first stage are not critical. They depend essentially on the quantity of modifying polymer which it is desired to incorporate in the vinyl chloride polymer. If appropriate, account will be taken of the quantity of other unsaturated monomer(s) polymerizable by a radical route which it has been decided to add to the polymerization mixture originating from the first stage before commencing the second stage, that is to say the polymerization of vinyl chloride by a radical route and, if appropriate, that of another monomer or other monomers which can be polymerized by this route.

The general conditions for the ionic polymerization of the lactone(s) are those generally applied to a polymerization of this type, except that the polymerization is carried out in vinyl chloride and not in a conventional organic solvent. In quantitative terms, the temperature of the polymerization reaction is generally situated below 100° C. and in most cases approximately between 15° and 60° C., and the operating pressure is equal to the saturated vapour pressure of vinyl chloride at the chosen polymerization temperature. The progress of the (exothermic) polymerization reaction is followed by measuring the difference in temperature between the heat transfer liquid and the polymerization mixture (positive Δt). The reaction is considered to be finished when the temperature difference Δt is equal to zero. The mixture is usually kept at polymerization temperature for another hour.

After the (co)polymerization of the lactone by an ionic route, the polymerization mixture is allowed to cool to room temperature. All the necessary ingredients for the conventional polymerization of vinyl chloride by a radical route in an aqueous dispersion are then introduced, starting with water. If appropriate, the unsaturated comonomer(s) polymerizable by a radical route is(are) introduced at the start of the second stage or after a delay during the second stage.

Polymerization in an aqueous suspension is intended to denote the techniques of polymerization in aqueous suspension or microsuspension.

In aqueous suspension polymerization the polymerization is performed with the aid of liposoluble initiators in the presence of conventional dispersing agents such as finely dispersed solids, gelatins, water-soluble cellulose ethers, synthetic polymers such as partially saponified polyvinyl acetates, polyvinylpyrrolidone, vinyl acetatemaleic anhydride copolymers and mixtures thereof. Surface-active agents may also be used at the same time as the dispersing agents. The quantity of dispersing agent which is used generally varies between 0.5 and 6 parts per thousand by weight relative to water.

In polymerization in aqueous microsuspension, sometimes also called polymerization in homogenized aqueous dispersion, an emulsion of monomer droplets is produced by virtue of powerful mechanical stirring and usually in the presence of emulsifying agents such as, for example, anionic emulsifying agents, and the polymerization is produced with the aid of liposoluble initiators.

Any liposoluble initiator may be employed in the polymerization in suspension or in microsuspension. By way of examples there may be mentioned peroxides such as di-tert-butyl peroxide, dilauroyl peroxide and acetyl cyclohexylsulphonyl peroxide, azo compounds such as azobisisobutyronitrile and azobis-2,4-dimethylvaleronitrile, dialkyl peroxydicarbonates such as diethyl, diisopropyl, dicyclohexyl and di-tert-butylcyclohexyl peroxydicarbonates, and alkylborons. These initiators are generally used in a proportion of 0.01 to 1% by weight relative to the monomers.

It is particularly advantageous to apply the process according to the invention to polymerization in aqueous suspension.

In addition to dispersing or emulsifying agents and initiators, the polymerization mixture may also contain various additives normally used in conventional aqueous dispersion polymerization processes. By way of examples of such additives there may be mentioned agents controlling the diameter of the polymer particles, agents controlling the molecular weight, stabilizers and colorants.

The conditions of polymerization by a radical route do not differ from those usually employed. The polymerization temperature is generally between 35° and 80° C. and the absolute pressure is generally below 15 kg/cm$^2$. The quantity of water which is used is generally such that the total weight of the monomers represents 20 to 50% of the total weight of water and of the monomers.

The vinyl chloride polymers obtained by following the process of the invention are isolated from their aqueous dispersion polymerization medium in a conventional manner.

The process according to the invention permits a simple and rapid manufacture, without intermediate isolation of the modifying lactone polymer, of homogeneous vinyl chloride polymers which are custom modified by means of the choice of the nature, the quantity and the method of use (simultaneous or successive) of the lactone(s).

The invention also relates to new vinyl chloride polymers modified with lactone polymers consisting of lactone polymers whose number-average molecular weight (Mn) is lower than 5,000, grafted with vinyl chloride polymers. It relates more particularly to such polymers in which the degree of grafting is higher than 50%.

Particularly preferred new polymers are those consisting of ε-caprolactone polymers whose numberconsisti average molecular weight (Mn) is lower than 5,000, advantageously between 2,000 and 4,000, which are grafted with vinyl chloride polymers and still more particularly such polymers in which the degree of grafting is higher than 50%.

The polymers of the invention may be processed by any of the usual techniques for processing compositions based on vinyl chloride polymers, such as, for example, injection, calendering or extrusion. They are particularly suitable for the production of flexible objects which can be employed in fields as diverse as the medical field (pouches for blood and for physiological fluids), the motor vehicle field, (various profiles and seals) or the building industry (sealing sheets, electrical cable sheathing).

The examples which follow are intended to illustrate the process and the modified polymers of the invention. They concern the manufacture of polyvinyl chloride modified with poly-ε-caprolactone.

In Example 1, according to the invention, the catalyst employed consists of the product of the reaction of one mole of triisobutylaluminum and of 1 mole of allyl alcohol, complexed with 3.7 moles of tetrahydrofuran.

In Example 2, according to the invention, the catalyst employed consists of the product of the reaction of one mole of triisobutylaluminum with 0.5 moles of allyl alcohol and 0.5 moles of water, complexed with 3.7 moles of tetrahydrofuran.

In Example 3, for comparison, the catalyst employed is identical with that of Example 1, except that allyl alcohol has been replaced with n-butanol.

In Example 4, for comparison, the catalyst is identical with that of Example 3. This example differs from Example 3 in that, at the end of the polymerization of ε-caprolactone (conforming in all aspects to Example 3), 3 moles of acryloyl chloride (that is 13 g) per gram-atom of aluminum are added to the polymerization mixture and there is a wait of 15 minutes before charging the ingredients (initiator, water, dispersant) needed in stage 2.

In Example 5, according to the invention, the catalyst employed consists of the product of the reaction of one mole of triisobutylaluminum and of one mole of allyl alcohol, complexed with 0.1 mole of tetrahydrofuran.

In Example 6, according to the invention, the catalyst employed consists of the product of the reaction of one mole of diethyl zinc with one mole of allyl alcohol, complexed with 3.7 moles of tetrahydrofuran.

In Example 7, according to the invention, the catalyst employed is identical with that employed in Example 2.

In Example 8, according to the invention, the catalyst employed is identical with that employed in Example 1, except that it is not complexed with tetrahydrofuran.

In Examples 1 to 6 and 8, the polymerization of vinyl chloride takes place in aqueous suspension and in Example 7 in aqueous microsuspension.

In all the examples the catalyst concentration amounts to 0.02 gram-atoms of metal per mole of ε-caprolactone.

To carry out Examples 1 to 7, a stainless steel laboratory reactor with a capacity of 3 liters is employed, fitted with a jacket for circulating a heat transfer fluid, a conventional stainless steel bladed stirrer, a set of dip pipes for introducing reactants and a conventional temperature control system.

EXAMPLES 1 to 4

Examples 1 to 4 were carried out in accordance with the operating procedure described below.

STAGE 1

Three applications of vacuum are performed, which are followed by nitrogen flushes. The catalyst is introduced under nitrogen blanketing and at 25° C. The reactor is isolated and the stirrer is started up (250 rev/min). Vinyl chloride is introduced via a dip pipe and the reactor contents are heated to 40° C. When the set temperature has been reached, the ε-caprolactone is introduced. The polymerization of ε-caprolactone is finished after 240 min ($t_0$+240 min) at 40° C. The degree of conversion is estimated at 100% (blank test).

STAGE 2

The reactor contents are cooled to 30° C. 10 ml of a 12% solution of azobisisobutyronitrile in dichloromethane are then introduced. Stirring is stopped. Five minutes after stopping the stirring, there are introduced, via a dip pipe, 1200 g of an aqueous solution containing 2 g/l of polyvinyl alcohol (degree of hydrolysis: 72.5; dynamic viscosity at 20° C. in aqueous solution at a concentration of 40 g/l: 30 mPa s) and containing 0.67 g/l of methyl hydroxypropyl cellulose (viscosity at 20° C. in aqueous solution at a concentration of 20 g/l: 100 mPa s, degree of methoxyl substitution from 1.31 to 1.93 and degree of hydroxypropyl substitution from 0.05 to 0.25). The stirrer is restarted (500 rev/min). The reactor contents are heated and maintained at 62° C. When the operating pressure has dropped by the value shown in the appended Table I, 8 ml of 2N aqueous ammonia are introduced, the reactor contents are cooled, stirring is reduced to approximately 50 rev/min, and degassing is carried out. At atmospheric pressure, a heat treatment is carried out (15 minutes at 75° C.), the reactor contents are cooled and the residual vinyl chloride is removed by steam treatment.

EXAMPLE 5

STAGE 1

Three applications of vacuum are carried out, followed by nitrogen flushes. The catalyst is introduced under nitrogen blanketing and at 25° C. The reactor is isolated and the stirrer is started up (250 rev/min). 700 g of vinyl chloride are introduced via a dip pipe and the reactor contents are heated to 50° C. When the set temperature has been reached, 300 g of ε-caprolactone are introduced via a dip pipe (time=$t_0$). After 3 hours' running at 50° C., the degree of conversion is estimated at 100% (blank test). 150 g of water are injected at this time.

STAGE 2

The reactor contents are cooled to 30° C. 0.7 g of dimyristyl peroxydicarbonate dissolved in 10 ml of dichloromethane are then introduced. Fifteen minutes later there are introduced, via a dip pipe, 1350 g of an aqueous solution containing 3.7 g/l of methyl hydroxypropyl cellulose (viscosity at 20° C. in aqueous solution at a concentration of 20 g/l: 100 mPa s, degree of methoxyl substitution from 1.31 to 1.93, degree of hydroxypropyl substitution from 0.05 to 0.25). The reactor contents are heated and maintained at 54° C., with a stirring speed of 500 rev/min. When the operating pressure has dropped by 3.5 bars, stirring is reduced to approximately 50 rev/min and degassing is carried out. At atmospheric pressure, a heat treatment is carried out (15 minutes at 75° C.) and the residual vinyl chloride is removed by steam treatment (5 minutes at 100° C.).

EXAMPLE 6

STAGE 1

Three applications of vacuum are carried out, followed by nitrogen flushes. 275 g of ε-caprolactone are introduced under nitrogen blanketing and at 25° C. The reactor is isolated and the stirrer is started up (250 rev/min). 725 g of vinyl chloride are introduced via a dip pipe, followed by the catalyst. The reactor contents are heated to 50° C. After 4 hours, running at 50° C., the conversion is estimated at 100% (blank test).

STAGE 2

The reactor contents are cooled to 40° C. 0.725 g of azobisisobutyronitrile dissolved in 10 ml of dichloromethane are then introduced. Fifteen minutes later, there are introduced via a dip pipe 1500 g of an aqueous solution containing 2.67 g/l of methyl hydroxypropyl cellulose (viscosity at 20° C. in aqueous solution containing 20 g/l: 100 mPa s, degree of methoxyl substitution from 1.31 to 1.93, degree of hydroxypropyl substitution from 0.05 to 0.25). The reactor contents are heated and maintained at 62° C., with a stirring speed of 500 rev/min. When the operating pressure has dropped by 5 bars, 21 ml of 2N aqueous ammonia are introduced; stirring is reduced to approximately 50 rev/min and degassing is carried out. At atmospheric pressure, a heat treatment is carried out (15 minutes at 75° C.) and the residual vinyl chloride is removed by steam treatment (5 minutes at 100° C.).

EXAMPLE 7

To perform this example, two stainless steel laboratory reactors 3 liters in capacity are employed (accessories described in Example 1), and a stainless steel laboratory homogenizer fitted with a homogenization valve, connected to the two reactors.

STAGE 1

Three applications of vacuum to the whole plant are carried out, followed by nitrogen flushes. The first polymerization reactor is then isolated. The catalyst is introduced while the reactor is blanketed with nitrogen and at 25° C. The reactor is isolated and the stirrer is started up (250 rev/min). 1000 g of vinyl chloride are introduced via a dip pipe and the reactor contents are heated to 50° C. When the set temperature has been reached, 100 g of ε-caprolactone are introduced via a dip pipe (time=$t_0$). After 3 hours' running at 50° C., the degree of conversion is estimated at 100% (blank test); the contents are cooled to 20° C. Stirring is then stopped.

STAGE 2

Five minutes after stopping the stirring, there are introduced, via a dip pipe, 1200 g of an aqueous solution containing 8.3 g/l of sodium laurylbenzenesulfonate and 150 g of an aqueous solution containing 2 g/l of ammonia. Stirring is restarted (250 rev/min). After five minutes 2.5 g of dilauroyl peroxide and 0.6 g of dimyristyl peroxydicarbonate dissolved in dichloromethane are introduced via a dip pipe. Twenty minutes after the introduction of the initiators the valves connecting the homogenizer to the two polymerization reactors are opened and the homogenizer is started up by adjusting the operating pressure to 200 bars. When all the mixture has been transferred into the second polymerization reactor, the latter is isolated. The contents are heated to 57° C. with stirring at 120 rev/min. At $t_0+4$ hours the stirring is speeded up to 150 rev/min. After a pressure drop of 1 bar, the conversion is estimated at 85%. The polymerization reactor contents are heated to 80° C.; when the pressure reaches 6 bars, stirring is reduced to approximately 50 rev/min and degassing is carried out. When atmospheric pressure is reached, the latex is brought up to boiling by evacuating and after 20 min of treatment the latex is cooled to room temperature.

In Examples 1 to 6 polyvinyl chloride modified with poly-ε-caprolactone (modified PVC.) was collected, after dewatering and drying, in the form of nonsticky, transparent, more or less spherical grains with a mean diameter of approximately 150-160 microns. In Example 7 the mean diameter is approximately 0.40 microns.

The appended Table I shows, for Examples 1 to 7, the quantities of caprolactone (CL), of vinyl chloride (VC) and of ionic catalyst (CATA) which are used, as well as the value of the pressure drop at the end of polymerization (ΔP), the degree of conversion of vinyl chloride (DC), the quantity of modified PVC. collected, the weight composition of the modified PVC (PVC/PCL proportion) (PCL=poly-ε-caprolactone), the degree of grafting of the modified PVC, and the number-average molecular weight (Mn) evaluated by gel permeation chromatography.

The seven modified PVC samples were examined in a composition containing, per 100 parts by weight of resin, 3 parts of a heat stabilizer of the calcium/zinc type, 2.5 parts of lubricant and 5 parts of epoxidized soya oil.

Premixes, each of 150 g, were blended for 8 minutes at 160° C. on a roll mill. The crepes obtained were then pressed for 4 minutes at 165° C. to form plaques 4 mm in thickness.

The evaluations carried out on the crepes and on the plaques of the seven samples are collated in the appended Table II. On the plaques manufactured according to Examples 1 and 2 and 5 to 7, according to the invention, the exudation was assessed after storage for one month at room temperature. On the plaques manufactured according to Examples 3 and 4, for comparison, the exudation was assessed after one day's storage at room temperature. None of the plaques manufactured according to Examples 1 to 7 exhibited any ungelled points.

Comparison of the results of Examples 1 and 2, according to the invention, with those of Example 3, for comparison, shows that the use of n-butanol instead of allyl alcohol in the preparation of the catalyst results in a very lightly grafted, flexible, modified polyvinyl chloride exhibiting problems of sticking to the roll during blending and, furthermore, an exudation phenomenon on pressed plaques.

Comparison of the results of Examples 1 and 2, according to the invention, with those of Example 4, for comparison, shows that the introduction of an unsaturation into the poly-ε-caprolactone after polymerization results in a lightly grafted, flexible, modified polyvinyl chloride exhibiting all the abovementioned disadvantages (sticking, exudation).

EXAMPLE 8

To carry out Example 8, a stainless steel reactor with a capacity of 300 liters is employed, fitted with a jacket for circulating a heat transfer fluid, a conventional stainless steel bladed stirrer, a set of dip pipes for introducing reactants and a conventional temperature control system.

STAGE 1

Three applications of vacuum are carried out, followed by nitrogen flushes. 142 g of catalyst, expressed as aluminum, are introduced under nitrogen blanketing and at 25° C. The reactor is isolated and the stirrer is started up (100 rev/min). 70 kg of vinyl chloride are introduced via a dip pipe and the reactor contents are heated to 50° C. When the set temperature is reached, 30 kg of ε-caprolactone are introduced. The polymerization of ε-caprolactone is finished after 120 min ($t_0+120$ min) at 50° C. The degree of conversion is estimated at 100% (blank test). The poly-ε-caprolactone has a number-average molecular weight (Mn) (evaluated by gel permeation chromatography) of 3487.

STAGE 2

The reactor contents are cooled to 30° C. 200 ml of a solution containing 44% of dimyristyl peroxidicarbonate in dichloromethane are then introduced. Five minutes later, there are introduced, via a dip pipe, 135 kg of an aqueous solution containing 3.7 g/l of methylhydroxypropyl cellulose (viscosity at 20° C. in aqueous solution at a concentration of 20 g/l: 100 mPa s, degree of methoxyl substitution from 1.31 to 1.93 and degree of hydroxypropyl substitution from 0.05 to 0.25). The reactor contents are heated and maintained at 54° C. The stirring speed is taken to 240 rev/min. When the operating pressure has dropped by 4 kg the reactor contents are cooled, stirring is reduced to approximately 20 rev/min and degassing is carried out. At atmospheric pressure, the residual vinyl chloride is removed by steam treatment (10 min at 100° C.).

After dewatering and drying, 86.50 kg of polyvinyl chloride modified with poly-ε-caprolactone (modified PVC) are collected in the form of nonsticky, transparent, more or less spherical grains with a mean diameter of 150–160 microns. The modified polymer collected contains 34% by weight of poly-ε-caprolactone whose degree of grafting is 51%.

The modified PVC sample was examined in a composition identical with that described above.

A 150 g premix was blended for 8 minutes at 160° C. on a roll mill without presenting any problem of sticking to the rolls. The crepe obtained was then pressed for 4 minutes at 165° C. to form a plaque 4 mm in thickness, transparent in appearance, whose initial Shore A hardness, measured at 23° C., is 79. After storage for one month at room temperature, the plaque still exhibited no exudation.

TABLE I

| No. of Example | Quantities used, g | | CATA (expressed as metal) | ΔP, bar | DC, % | Quantity of modified PVC, g | Weight proportion PVC/PCL | Degree of grafting, % | Mn |
|---|---|---|---|---|---|---|---|---|---|
| | CL | VC | | | | | | | |
| 1 | 280 | 520 | 1.33 | 3.5 | 84 | 718 | 61/39 | 60 | 3806 |
| 2 | 240 | 560 | 1.14 | 5 | 91 | 750 | 68/32 | 52 | 8412 |
| 3 | 280 | 520 | 1.33 | 3.5 | 84 | 718 | 61/39 | 9 | 3900 |
| 4 | 280 | 520 | 1.33 | 3.5 | 81 | 700 | 60/40 | 22 | 3924 |
| 5 | 300 | 700 | 1.42 | 3.5 | 80 | 860 | 65/35 | 51.5 | 3823 |
| 6 | 275 | 725 | 3.14 | 5.0 | 81 | 862 | 68/32 | 58 | 4167 |
| 7 | 100 | 1000 | 0.47 | 1.0 | 85 | 950 | 89.5/10.5 | 90 | 7565 |

TABLE II

| No. of Example | Behaviour on blending | Plaque appearance | Initial Shore A hardness, 23° C. |
|---|---|---|---|
| 1 | normal | transparent, no exudation | 62 |
| 2 | normal | transparent, no exudation | 79 |
| 3 | sticking to rolls | transparent, exudation | 62 |
| 4 | sticking to rolls | transparent, exudation | 58 |
| 5 | normal | transparent, no exudation | 76 |
| 6 | normal | transparent, no exudation | 80 |
| 7 | normal | transparent, no exudation | 100 |

What is claimed is:

1. Process for the manufacture of vinyl chloride polymers modified with lactone polymers, in which, in a first stage, a lactone is polymerized by an ionic route in vinyl chloride and, in a second stage, the said vinyl chloride, to which other ethylenically unsaturated monomers capable of being polymerized by a radical route are optionally added, is polymerized by a radical route in aqueous suspension and in the presence of the polymerization medium from the first stage, characterized in that the ionic catalyst of the first stage consists of the product, optionally complexed with tetrahydrofuran, of the reaction of an alkylmetal with an ethylenically unsaturated alcohol, optionally in the presence of water.

2. Process for the manufacture of modified vinyl chloride polymers according to claim 1, characterized in that the alkylmetal contains straight- or branched-chain alkyl groups containing from 1 to 18 carbon atoms and in that the ethylenically saturated alcohol is chosen from primary, secondary or tertiary ethylenically unsaturated alcohols in which the ethylenic unsaturations are situated at the end of a chain and which contain from 3 to 20 carbon atoms.

3. Process for the manufacture of modified vinyl chloride polymers according to claim 1 characterized in that the alkylmétal comprises identical alkyl groups containing from 2 to 5 carbon atoms, in that the metal of the alkylmetal is chosen from aluminum and/or zinc and in that the ethylenically unsaturated alcohol is chosen from ethylenically monounsaturated primary alcohols in which the ethylenic unsaturation is situated at the end of a chain and which contain from 3 to 6 carbon atoms.

4. Process for the manufacture of modified vinyl chloride polymers according to claim 1, characterized in that from 0.1 to 3 moles of ethylenically unsaturated alcohol and, if appropriate, from 0.01 to 0.5 moles of water per gram-atom of active metal are reacted, optionally in the presence of 0.1 to 20 moles of tetrahydrofuran.

5. Process for the manufacture of modified vinyl chloride polymers according to any one of claims 1 characterized in that the ionic catalyst of the first stage is complexed with tetrahydrofuran.

6. Process for the manufacture of modified vinyl chloride polymers according to any one of claim 1 characterized in that the ionic catalyst of the first stage is not complexed with tetrahydrofuran.

7. Process for the manufacture of modified vinyl chloride polymers according to claim 1, characterized in that the catalyst is used in a proportion of 0.001 to 0.1 gram-atoms of active metal per mole of monomer capable of being polymerized by an ionic route.

8. Process for the manufacture of modified vinyl chloride polymers according to claim 7, characterized in that the catalyst concentration is controlled so as to produce lactone polymers whose number-average molecular weight is less than 10,000.

9. Process for the manufacture of modified vinyl chloride polymers according to claim 1, characterized in that the lactone is δ-caprolactone.

10. Process for the manufacture of modified vinyl chloride polymers according to claim 1, characterized in that, in the second stage, the polymerization by a radical route takes place in aqueous suspension.

11. Vinyl chloride polymers modified with lactone polymers, characterized in that they consist of lactone polymers whose number-average molecular weight is less than 5,000, grafted with vinyl chloride polymers.

12. Modified vinyl chloride polymers according to claim 11, characterized in that they consist of ε-caprolactone polymers whose number-average molecular weight is less than 5,000, grafted with vinyl chloride polymers and whose degree of grafting is higher than 50%.

* * * * *